US008375103B2

(12) United States Patent
Lin et al.

(10) Patent No.: US 8,375,103 B2
(45) Date of Patent: Feb. 12, 2013

(54) SYSTEM AND METHOD FOR FILE ACCESS AND SHARING

(75) Inventors: Chih-Chiang Lin, Taipei (TW); Hung-Chun Kao, Taipei (TW); Yu-Sheng Lin, Taipei (TW); Ting-Yu Chiang, Taipei (TW); Shih-Hui Wu, Taipei (TW); Wen-Yuan Wang, Taipei (TW); Cho-Hsuan Lee, Taipei (TW); Chi-Ming Luo, Taipei (TW); Yi-Hua Liang, Taipei (TW); Min-Hui Wu, Taipei (TW); Hsiao-Yun Chen, Taipei (TW); Kuan-Yi Chang, Taipei (TW); Chi-Hsiu Huang, Taipei (TW); Jia-Bin Lai, Taipei (TW); Heng-Chang Lin, Taipei (TW); Yu-Hsiang Wang, Taipei (TW)

(73) Assignee: D-Link Corporation, Taipei (TW)

( * ) Notice: Subject to any disclaimer, the term of this patent is extended or adjusted under 35 U.S.C. 154(b) by 187 days.

(21) Appl. No.: 13/064,004

(22) Filed: Mar. 2, 2011

(65) Prior Publication Data
US 2012/0151002 A1 Jun. 14, 2012

(30) Foreign Application Priority Data

Dec. 10, 2010 (TW) .............................. 99143170 A

(51) Int. Cl.
*G06F 15/16* (2006.01)
(52) U.S. Cl. .......................... 709/218; 709/217; 709/219

(58) Field of Classification Search .................. 709/217, 709/218, 219, 224, 201, 220, 245; 370/312, 370/310; 348/552; 719/328; 386/291
See application file for complete search history.

(56) References Cited

U.S. PATENT DOCUMENTS

| | | | |
|---|---|---|---|
| 6,678,462 B1* | 1/2004 | Chihara ........................ 386/291 |
| 2003/0212824 A1* | 11/2003 | Yoshizawa et al. ........... 709/245 |
| 2005/0228858 A1* | 10/2005 | Mizutani et al. .............. 709/201 |
| 2007/0061430 A1* | 3/2007 | Kim ............................... 709/220 |
| 2009/0007156 A1* | 1/2009 | Baek et al. ..................... 719/328 |
| 2009/0089353 A1* | 4/2009 | Fukuta et al. ................. 709/201 |
| 2009/0129301 A1* | 5/2009 | Belimpasakis ............... 370/310 |
| 2010/0005166 A1* | 1/2010 | Chung .......................... 709/224 |
| 2010/0231790 A1* | 9/2010 | Ansari et al. .................. 348/552 |
| 2011/0188439 A1* | 8/2011 | Mao et al. ..................... 370/312 |
| 2011/0320572 A1* | 12/2011 | Damola ........................ 709/219 |

* cited by examiner

*Primary Examiner* — Le H Luu
(74) *Attorney, Agent, or Firm* — Bacon & Thomas, PLLC

(57) ABSTRACT

The present invention is to provide a system including at least one storage device for storing at least one file each having a file name, a home gateway having a routing identification code and connected to the storage device, and a server connected to the home gateway via the Internet for receiving the routing identification code and the file name uploaded by the home gateway. The server stores a user's registration information corresponding to the routing identification code. When a terminal device connected to the server via the Internet uses the registration information to pass the server's verification and thus log in the server, the server transmits the file name to the terminal device and, when receiving a request instruction from the terminal device, then retrieves the file from the storage device by way of the home gateway and then sends the file to the terminal device as requested.

12 Claims, 5 Drawing Sheets

SYSTEM AND METHOD FOR FILE ACCESS AND SHARING

FIELD OF THE INVENTION

The present invention relates to a system for file access and sharing, which enables a user to connect a storage device to a home gateway (or a router) and then enables the user to access the storage device for retrieving desired files therefrom via a terminal device that has been verified by a server, or sharing the desired files stored in the storage device with others.

BACKGROUND OF THE INVENTION

With the development of the Internet and the advancement of digital technology, digital files—including image files (e.g., photos), audio files (e.g., music, audio recordings), video files (e.g., video recordings), and so on—can now be shared among friends over the Internet as an exchange of thoughts or sentiments. In addition to sending the files directly to the intended friends via electronic mails (e-mails), file sharing is enabled by websites that provide online photo album or online storage functions. Image files uploaded to such websites can be viewed by the uploaders' friends directly at the websites, and audio or video files which have been uploaded beforehand can be downloaded to a terminal device so as to be played using an audio/video playing software (e.g., KMPlayer).

Presently, there are a plethora of websites that provide online photo album or online storage services. Some notable examples of online photo album websites (also known as "web albums") are Picasa Web Albums and Flickr, the services of both of which are free of charge. As to online storage (also known as "web hard drive"), the most popular websites include MEGAUPLOAD, RapidShare, SendSpace, and so forth. These online storage websites typically allow some (or all) of their functions to be used free of charge by the general public, so users can utilize the basic upload/download functions without paying fees or upload/download files at a basic transfer speed (which is lower than that applicable to fee-paying members). As the online storage services are free, they are generally referred to as "free file hosting".

The foregoing online photo album and online storage services not only make file sharing possible, but also enable remote file access and data backup. More particularly, a user can apply for a user name at an online storage website and, with the user name, upload files from a first terminal device (e.g., a personal computer in the user's home) to the web hard drive. When the user, now operating a second terminal device (e.g., a personal computer in the user's office), needs to access the previously uploaded files, the user can connect the second terminal device to the online storage website (web hard drive) via the Internet and log in the website by using the user name so as to download the needed files. The user can also manage the files in the web hard drive, such as by executing the file deleting and/or editing functions. Thus, the user only has to upload files to the web hard drive in advance, and the files are accessible to the user anywhere and anytime.

However, as the files must be sent to the web hard drive (or web album) one after another, the file transfer process is rather time-consuming, especially when the number of files is large. Moreover, when the total size of the uploaded files reaches the upper limit of the storage capacity of the web hard drive (or web album), no more files are allowed to be uploaded, which is indeed an undesirable limitation in use. Apart from that, while the files uploaded to the web hard drive (or web album) are intended to be shared with the uploader's friends, the files may be accessed or even maliciously used by irrelevant users such that the uploader's privacy is infringed.

In addition to the file access and sharing methods described above, the widespread broadband network connections have enabled file transfer by the File Transfer Protocol (FTP), which is a standard network protocol for file transfer. A user may apply to an Internet service provider (ISP) for a fixed IP address with which a personal computer in the user's home can make Internet connections. This personal computer can be set up as an FTP server after, among other things, installation of FTP server programs. Then, the FTP server can be set with one or more sets of user names and passwords according to practical needs. Thus, the files stored in the personal computer in the user's home can be accessed remotely by the user using a terminal device which is installed with an FTP client program and located in the user's office or elsewhere after the user logs in the FTP server from the terminal device with the preset user name and password. As for file sharing, the user may activate the anonymous login function of the FTP server or create user names and passwords for other users (e.g., the user's friends), so as for the other users to log in the FTP server either anonymously or with the user names and passwords created for them and download the files intended to be shared.

Nevertheless, the setup of FTP servers is a complex procedure and involves complicated settings that are prohibitively difficult for ordinary users, which explains why file access and sharing through FTP is not yet popular. Besides, according to FTP, passwords and file contents are transmitted in plain text. As a result, the packets being transmitted are very likely to be intercepted, which raises data security concerns. Also, personal computers set up as FTP servers may be broken into by those with ill intentions and be installed with Trojan horse programs or other malware, thus turning the FTP servers into a springboard for cyber attacks. Last but not least, personal computers set up as FTP servers must always be turned on so that terminal devices can connect to them at any time for file download. In consequence, such personal computers are vulnerable to overload and may have a short service life, which translates into extra financial burden on users.

Hence, the issue to be addressed by the present invention is to provide improvement over the conventional methods for accessing and sharing files. In particular, it is desirable to save the time otherwise required for uploading files sequentially and to achieve remote file access and sharing with enhanced data security but without complicated settings.

BRIEF SUMMARY OF THE INVENTION

In view of the various shortcomings of the conventional methods for file access and sharing, the inventor of the present invention conducted extensive research and repeated trials and finally succeeded in developing a system for file access and sharing as disclosed herein. It is hoped that the present invention will not only enable file sharing in a simple and secure manner but also effectively save the time otherwise required for uploading files one after another.

It is an objective of the present invention to provide a system for file access and sharing, wherein the system includes at least one storage device, a home gateway (or a router), and a server. Each storage device (e.g., a USB flash drive, a USB hard drive, SD Card) is connected to the gateway (or router) and stores at least one file (e.g., an image file, an audio file), wherein each file has a file name. The home gateway (or router) has a routing identification code and is connected to the server via the Internet so as to upload the routing identification code and the file name(s) to the server.

The server stores a user's registration information (e.g., a user name and a password). The registration information corresponds to the routing identification code of the home gateway (or router), meaning that the user corresponding to the registration information is the owner of the home gateway (or router). When a terminal device is connected to the server via the Internet and uses the registration information to pass the server's verification and thus log in the server, the server transmits the file name(s) stored in the at least one storage device to the terminal device. In order to request for the file corresponding to a certain file name, the terminal device sends to the server a request instruction containing the file name. Upon receiving the request instruction, the server, according to the file name, retrieves the file corresponding thereto from the storage device by way of the home gateway (or router) and then sends the file to the terminal device. Thus, with the terminal device, the user can read from the at least one storage device the contents of the intended file sequentially through the Internet, the server, and the home gateway (or router). The technical features of the present invention enable remote file access without complicated settings and help save the time otherwise required to transfer files to a conventional web space. The user only has to connect the at least one storage device to the home gateway (or router), and the desired file can be retrieved from the at least one storage device via any terminal device that has been verified by the server.

It is another objective of the present invention to provide the foregoing system for file access and sharing, wherein the server, upon receiving a sharing instruction from the terminal device, generates an encoded website address corresponding to the file intended to be shared. Then, the server sends the encoded website address to the terminal device, from which the encoded website address can be sent to a second terminal device, allowing the second terminal device to connect to the server via the encoded website address. Based on the encoded website address, the server retrieves the corresponding file from the at least one storage device by way of the home gateway (or router) and sends the file to the second terminal device. Thus, the user of the second terminal device can read the contents of the file, and the objective of file sharing is achieved. Even if the at least one storage device stores a large number of files, there is no need for the user to upload the files one after another to a conventional web space. All that needs to be done is for the user to send, from the terminal device that the user is operating to another terminal device, the encoded website address of the file to be shared. By doing so, the time otherwise required for uploading a great number of files is effectively saved, and an otherwise necessary complicated setting procedure is dispensed with.

It is another objective of the present invention to provide the foregoing system for file access and sharing, wherein during the generation of the encoded website address, the server sets an upper limit to the number of times for which the encoded website address can be used. When the encoded website address has been used for as many times as the upper limit, meaning that the number of times for which the server has retrieved the file according to the encoded website address reaches the upper limit, the server annuls the corresponding relationship between the encoded website address and the routing identification code and the file name, thereby rendering the encoded website address invalid.

It is yet another objective of the present invention to provide the foregoing system for file access and sharing, wherein each storage device has a storage identification code. The home gateway (or router) sends the routing identification code and the storage identification code(s) simultaneously to the server. Thus, even if the user connects a plurality of storage devices to the home gateway (or router), the server can identify each storage device and correctly retrieve the file requested by the user.

BRIEF DESCRIPTION OF THE SEVERAL VIEWS OF THE DRAWINGS

The structure as well as a preferred mode of use, further objectives, and advantages of the present invention will be best understood by referring to the following detailed description of some illustrative embodiments in conjunction with the accompanying drawings, in which.

DETAILED DESCRIPTION OF THE INVENTION

The inventor of the present invention has long been engaged in the research and development of network communication technology and found that it is now common practice for people wishing to share image, audio, or video files with others to upload the files to a web space (e.g., a web hard drive or web album) from which other people can retrieve the files to be shared and to which the uploaders themselves can connect by means of any terminal devices so as to access the files. However, the process of uploading the files sequentially to the web space takes a lot of time. In consideration of this and in order to achieve remote file access and sharing, the inventor of the present invention came up with the concept of connecting a storage device to a home gateway (or a router) and allowing a terminal device which has been verified by a server to access the files in the storage device by way of the server.

Figure 1:
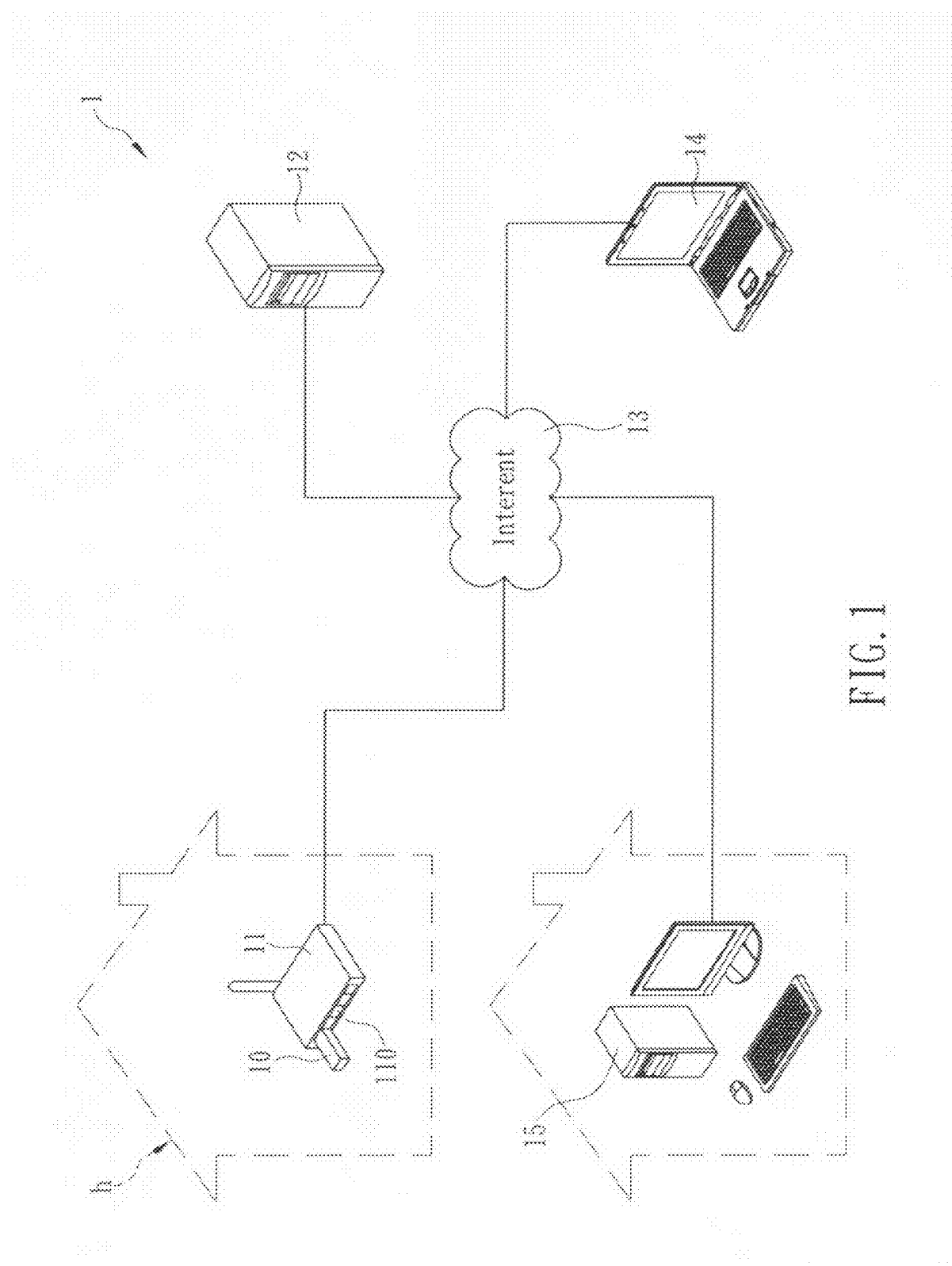
FIG. 1 is a schematic drawing of a system according to the present invention.

The present invention provides a system for file access and sharing. Referring to FIG. 1 for a first preferred embodiment of the present invention, a system 1 for file access and sharing includes a storage device 10, a home gateway (or a router) 11, and a server 12, wherein the storage device 10 is a USB flash drive and is connected to the home gateway (or router) 11. It should be pointed out that, in this preferred embodiment, both the storage device 10 and the home gateway (or router) 11 are provided in a user's home h. Besides, the storage device 10 is not limited to a USB flash drive; the user may connect a USB hard drive (or other devices) to the home gateway (or router) 11 as the storage device 10. The storage device 10 in this preferred embodiment stores three files, which include an image file "Family.jpg", an audio file "My-voice.mp3", and a video file "Funny-Cat.wmv", each file having its own file name, i.e., "Family.jpg", "My-voice.mp3", or "Funny-cat.wmv". All the files and the storage device 10 belong to the same user. In addition, the storage device 10 has a storage identification code, and the home gateway (or router) 11 has a routing identification code. The home gateway (or router) 11 is configured to identify the storage device 10 by the storage identification code. Nonetheless, the present invention is not limited to this identification mechanism. For instance, it is feasible for the home gateway (or router) 11 to identify the storage device 10 by the position at which the storage device 10 is connected to the home gateway (or router) 11. The technical features described above allow the user to connect a plurality of storage devices to a plurality of slots 110 of the home gateway (or router) 11 respectively and simultaneously. For the sake of simplicity, however, a single storage device 10 is exemplified in the present embodiment to avoid confusion.

Referring to FIG. 1, the home gateway (or router) 11 is connected to the server 12 via the Internet 13. The server 12 stores the registration. information (e.g., a user name and a password) of the aforesaid user. The registration information corresponds to the routing identification code of the home gateway (or router) 11, which means that the user corresponding to the registration information is the owner of the home gateway (or router) 11 (and at the same time the owner of the storage device 10). In practice, before the system can work, it is necessary for the user to be at home h, connect the home gateway (or router) 11 to the server 12, and then apply for registration of the registration information. Once the registration is completed, the server 12 relates the registration information to the routing identification code.

Figure 2:
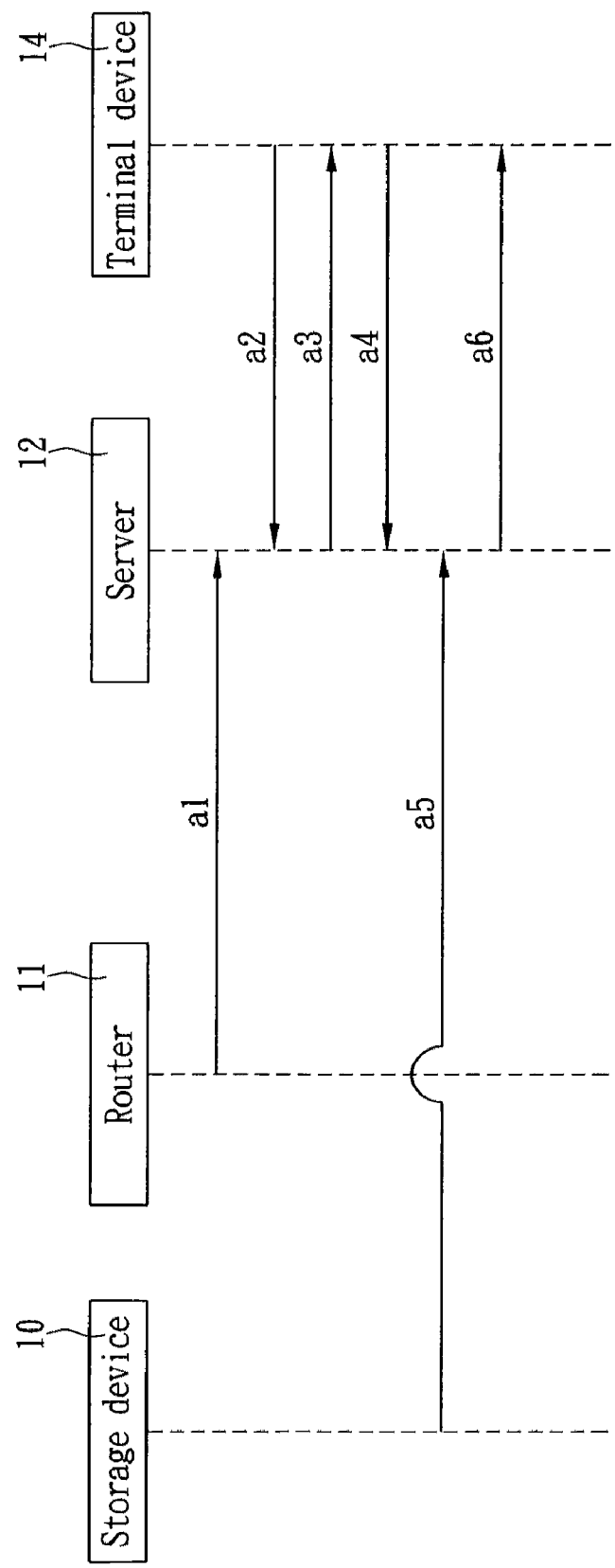
FIG. 2 is a time sequence diagram of a first preferred embodiment of the present invention.

In the first preferred embodiment, the user wishes to access the files in the storage device 10 while operating a terminal device 14 (e.g.; a laptop computer) away from home h. The system 1 for file access and sharing provides remote access through the following steps, whose time sequence is shown in FIG. 2:

(1) Step a1: The home gateway (or router) 11 uploads the routing identification code, the storage identification code, and the file names "Family.jpg", "My-voice.mp3", "Funny-Cat.wmv" to the server 12 via the Internet 13, so as for the server 12 to identify the home gateway (or router) 11, the storage device 10, and the files.

(2) Step a2: The terminal device 14 sends the registration information to the server 12 and, after being verified thereby, successfully logs in the server 12. In other words, the user uses the terminal device 14 and the registration information to log in the server 12.

Figure 3:
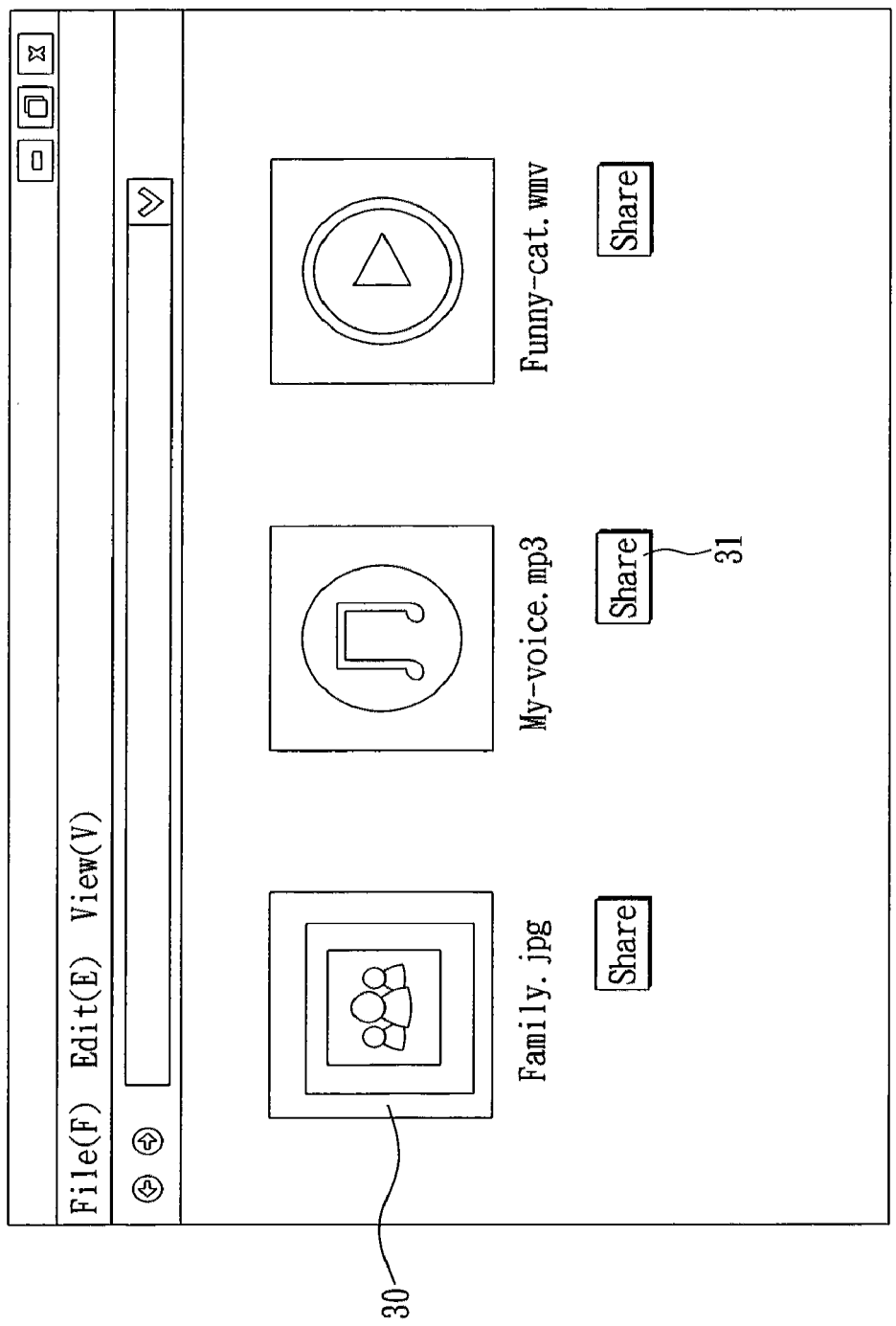
FIG. 3 schematically shows a screen image of a terminal device according to the present invention.

(3) Step a3: The server 12 transmits the file names, the routing identification code, and the storage identification code to the terminal device 14, thus allowing the user to know—by means of the terminal device 14—the file names "Family.jpg", "My-voice.mp3", "Funny-Cat.wmv" stored in the storage device 10. As shown in FIG. 3, the server 12 displays the file names in a web page that is shown in the browser of the terminal device 14.

(4) Step a4: The terminal device 14 sends a request instruction to the server 12, wherein the request instruction contains at least one file name, the routing identification code, and the storage identification code. For example, referring to FIG. 3, if the user wishes to read the file "Family.jpg", the user can select the icon 30 in the web page that corresponds to the file "Family.jpg" and thereby send the request instruction to the server 12.

(5) Step a5: According to the file name "Family.jpg", the routing identification code, and the storage identification code in the request instruction, the server 12 retrieves the file "Family.jpg" from the storage device 10 sequentially through the Internet 13 and the home gateway (or router) 11.

Figure 4:
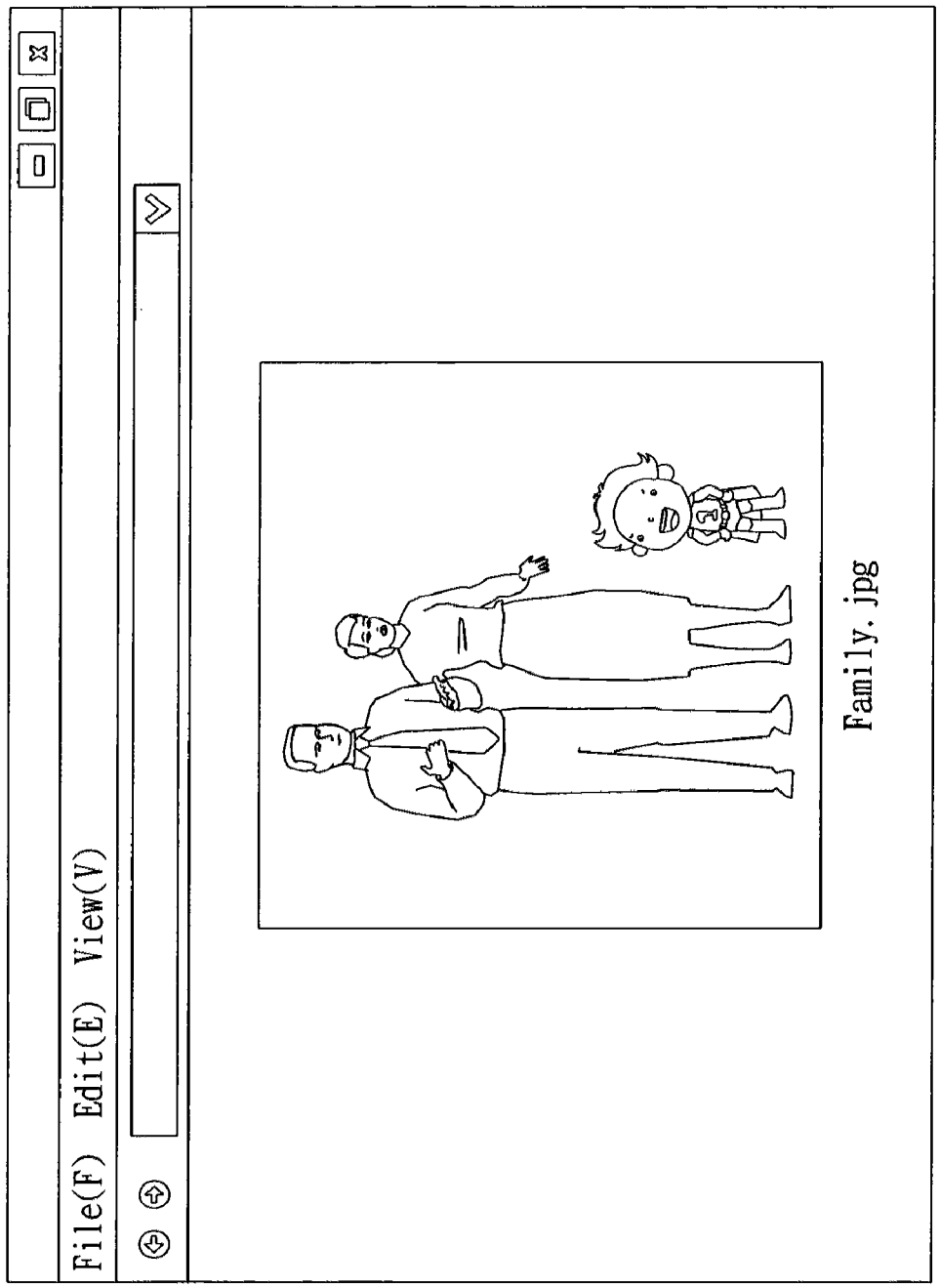
FIG. 4 schematically shows another screen image of the terminal device according to the present invention.

(6) Step a6: The server 12 sends the file "Family.jpg" to the terminal device 14. The user can either view the file directly through the browser of the terminal device 14 (as shown in FIG. 4) or download the file to the terminal device 14.

Referring again to FIG. 1, through the foregoing steps, the user can use the terminal device 14 to read the files in the storage device 10 sequentially through the Internet 13, the server 12, and the home gateway (or router) 11, wherein the reading of the files includes viewing images, listening to music, and so on. Therefore, the user, when operating the terminal device 14 away from home h and suddenly in need of the files in the storage device 10, can use the terminal device 14 to log in the server 12, so as to know the file names in the storage device 10 through the browser and download the needed files to the terminal device 14. Thus, the user has remote access to the files. The technical features of the first preferred embodiment spare the user not only the inconvenience of setting up an FTP server via complicated settings, but also the time-consuming process of transferring the files sequentially to a web album or web hard drive. The user only has to connect the storage device 10 to the home gateway (or router) 11, and the files in the storage device 10 can be retrieved from the storage device 10 via any terminal device (e.g., the terminal device 14) that has been verified by the server 12. Consequently, the time otherwise required for uploading the files one after another is saved, and the security concerns associated with the setup of FTP servers effectively eliminated. Furthermore, unlike web albums or web hard drives, the disclosed system has no limitation in capacity. The user can use a storage device 10 of the desired storage capacity or connect a plurality of storage devices to the home gateway (or router) 11 at the same time. In short, the present invention allows unlimited expansion of storage capacity.

Figure 5:
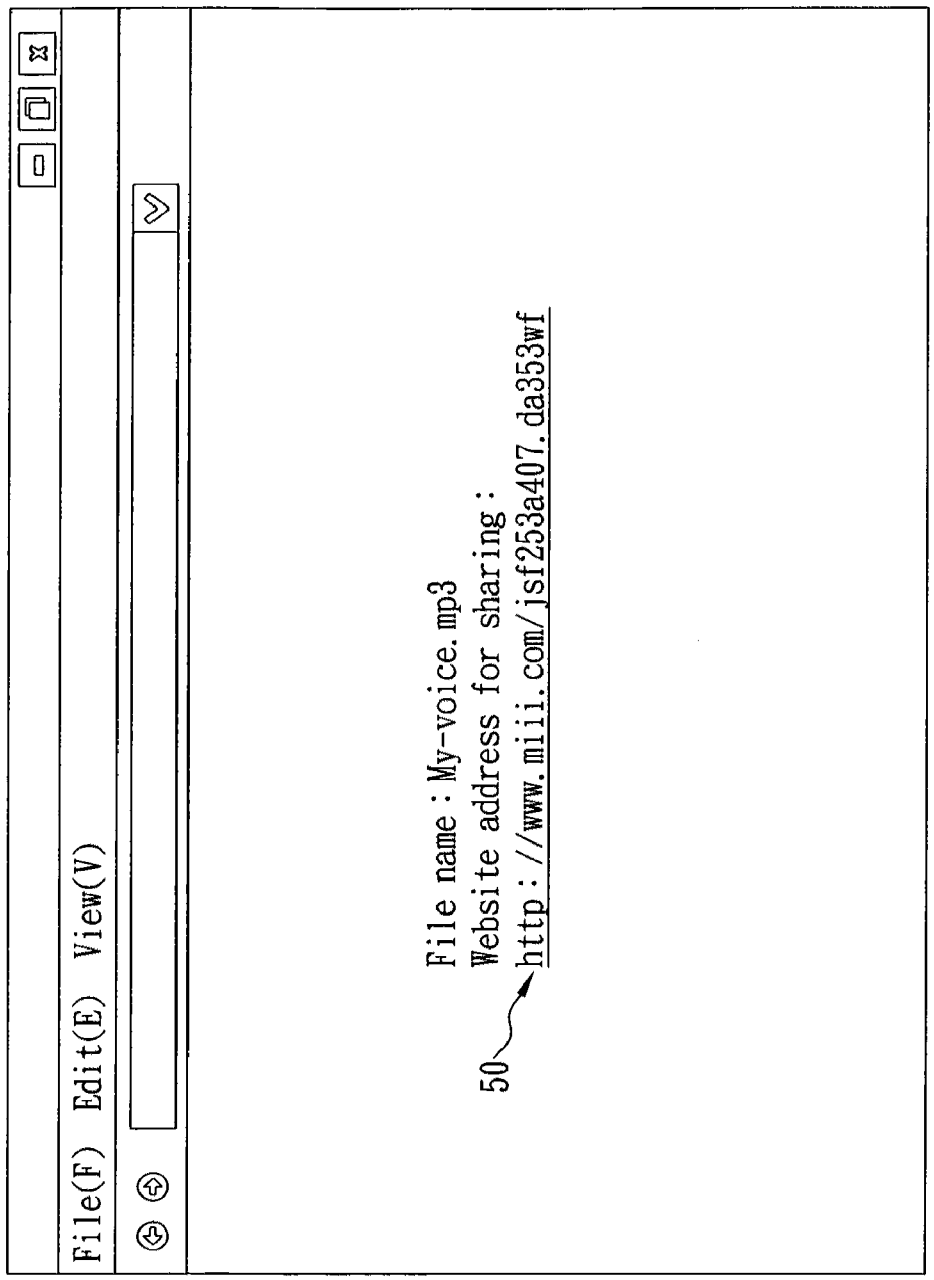
FIG. 5 schematically shows a screen image of a terminal device according to a second preferred embodiment of the present invention.

In addition to the aforesaid technical features, file sharing is achieved in a second preferred embodiment of the present invention via transmission of encoded website addresses so that the user can share files with other users (e.g., the user's friends) in a safe and rapid manner. With reference to FIG. 1, in the second preferred embodiment, the user, after logging in the server 12 with his or her registration information using the terminal device 14, sees the image displayed in the browser of the terminal device 14 as depicted in FIG. 3. In FIG. 3, a Share button 31 is provided below each of the file names "Family.jpg", "My-voice.mp3", "Funny-Cat.wmv". When the user clicks the Share button 31 below the file name "My-voice.mp3" with a mouse, the terminal device 14 sends a sharing instruction to the server 12, wherein the sharing instruction contains the routing identification code, the storage identification code, and the file name "My-voice.mp3". In response, referring to FIGS. 1 and 5, the server 12 generates an encoded website address 50, such as "http://www.miii.com/jsf253a407.da353wf", that corresponds to the routing identification code, the storage identification code, and the file name. The server 12 sends the encoded website address 50 to the terminal device 14 so that the screen image shown in FIG. 5 is displayed in the browser of the terminal device 14 for the user to see. It should be pointed out that the encoded website address 50 corresponding to the routing identification code, the storage identification code, and the file name "My-voice.mp3" has gone through an encoding process (e.g., with a hash function), making it impossible for the user or other people to identify the routing identification code and like information in the encoded website address 50.

Referring again to FIGS. 1 and 5, the user having received the encoded website address 50 can operate the terminal device 14 so as to copy the encoded website address 50 to an e-mail and send the e-mail to a friend's terminal device 15. Once the terminal device 15 receives the e-mail sent by the user, the user's friend can click the encoded website address 50 in the e-mail with a mouse and thereby connect the terminal device 15 to the server 12. Based on the encoded website address 50, the server 12 retrieves the corresponding file "My-voice.mp3" from the storage device 10 by way of the home gateway (or router) 11 and then sends the file to the terminal device 15, allowing the user's friend to download the file from the server 12 using the terminal device 15. Therefore, if the user wishes to share with others a large number of files that are stored in the storage device 10, it is no more necessary to upload the files sequentially to a conventional web space, for the technical features of the second preferred embodiment have made file sharing more convenient. In a nutshell, the user logs in the server 12 from the terminal device 14 and obtains the encoded website address corresponding to the file to be shared. Then, the user sends the encoded website address to others via e-mails or an instant messenger software, such as MSN, gTalk, Yahoo! Messenger, thus achieving the objective of file sharing while saving the time otherwise required for file upload. Further, when the user decides not to share the files in the storage device 10 any more, all that needs to be done is to disconnect the storage device 10 from the home gateway (or router) 11. As the files need not be deleted successively, more time can be saved.

With reference to FIGS. 1 and 5, when generating the encoded website address 50, the server 12 sets an upper limit to the number of times for which the encoded website address 50 can be used (e.g., three times), with a view to preventing irrelevant users from using the encoded website address for file download. Thus, the files in the storage device 10 are protected from leaking. The server 12 is configured to record the number of times it has retrieved the file corresponding to the encoded website address 50. As soon as the number reaches the upper limit, the server 12 annuls the corresponding relationship between the encoded website address 50 and the routing identification code, the storage identification code, and the file name. Consequently, the encoded website address 50 becomes invalid, and it is impossible for any terminal device to use the now invalid encoded website address 50 to access the previously corresponding file. As the files in the storage device 10 are prevented from leaking without the user knowing it, the user's privacy is ensured. However, the data security measures of the present invention are not limited to the foregoing. For instance, the system 1 for file access and sharing according to the present invention may be so designed that the server 12 sets a time limit to the encoded website address 50 (e.g., 72 hours). Once the time elapsed after generation of the encoded website address 50 reaches the time limit, the server 12 eliminates the corresponding relationship between the encoded website address 50 and the routing identification code, the storage identification code, and the file name. Thus, the encoded website address 50 is invalidated, and the file kept safe as well.

While the invention has been described by means of specific embodiments, numerous modifications and variations could be made thereto by those skilled in the art without departing from the scope of the invention set forth in the claims.

What is claimed is:

1. A system for file access and sharing, comprising:
   a storage device storing a file, the file having a file name;
   a home gateway having a routing identification code and connected to the storage device; and
   a server connected to the home gateway via the Internet so as for the home gateway to upload the routing identification code and the file name to the server, the server storing a user's registration information, the registration information corresponding to the routing identification code, wherein when a terminal device passes verification of the server by using the registration information and thus logs in the server, the server transmits the routing identification code and the file name to the terminal device, and when the terminal device sends to the server a request instruction containing the routing identification code and the file name, the server, according to the routing identification code and the file name in the request instruction, retrieves the file corresponding to the file name from the storage device by way of the home gateway and sends the file to the terminal device.

2. The system of claim 1, wherein the storage device has a storage identification code, and the home gateway sends the storage identification code to the server while sending the routing identification code to the server.

3. The system of claim 2, wherein the request instruction further contains the storage identification code.

4. The system of claim 3, wherein when the terminal device sends to the server a sharing instruction containing the routing identification code, the storage identification code, and the file name, the server generates an encoded website address corresponding to the routing identification code, the storage identification code, and the file name and transmits the encoded website address to the terminal device.

5. The system of claim 4, wherein when a second terminal device is connected to the server via the encoded website address, the server, according to the routing identification code, the storage identification code, and the file name that correspond to the encoded website address, retrieves the file from the storage device by way of the home gateway and sends the file to the second terminal device.

6. The system of claim 5, wherein the server, while generating the encoded website address, sets an upper limit to the number of times for which the encoded website address can be used, and when the number of times for which the server has retrieved the file according to the encode website address reaches the upper limit, the server annuls a corresponding relationship between the encoded website address and the routing identification code, the storage identification code, and the file name, thereby invalidating the encoded website address.

7. A method for file access and sharing, the method being applicable to a storage device, a home gateway, and a server, wherein the storage device stores a file having a file name and is connected to the home gateway, and the home gateway has a routing identification code and is connected to the server via the Internet, the method comprising the steps, performed by the server, of:
   receiving the routing identification code and the file name from the home gateway;
   receiving registration information from a terminal device so as for the terminal device to pass verification and log in the server;
   sending the routing identification code and the file name to the terminal device;
   receiving a request instruction from the terminal device, the request instruction containing the routing identification code and the file name;
   retrieving the file from the storage device by way of the home gateway according to the request instruction; and
   sending the file to the terminal device.

8. The method of claim 7, further comprising the step, performed by the home gateway, of:
   sending a storage identification code of the storage device to the server while sending the routing identification code to the server.

9. The method of claim 8, wherein the request instruction further contains the storage identification code.

10. The method of claim 9, further comprising the steps, performed by the server, of:
    receiving a sharing instruction from the terminal device, the sharing instruction containing the routing identification code, the storage identification code, and the file name; and generating an encoded website address that corresponds to the sharing instruction and sending the encoded website address to the terminal device.

11. The method of claim 10, further comprising the steps, performed by the server, of:
- accepting a request made by a second terminal device to connect to the server via the encoded website address;
- retrieving the file from the storage device by way of the home gateway according to the routing identification code, the storage identification code, and the file name that correspond to the encoded website address; and
- sensing the file to the second terminal device.

12. The method of claim 11, further comprising the steps, performed by the server, of:
- setting an upper limit to the number of times for which the encoded website address can be used; and
- annulling a corresponding relationship between the encoded website address and the routing identification code, the storage identification code, and the file name and thereby invalidating the encoded website address, when the number of times for which the server has retrieved the file according to the encoded website address reaches the upper limit.

* * * * *